United States Patent
Hobbs et al.

(10) Patent No.: US 9,061,251 B2
(45) Date of Patent: Jun. 23, 2015

(54) SELF SEALING MEMBRANE CONTACTOR WITH PTFE TUBULAR MEMBRANES

(75) Inventors: Kenneth Donald Hobbs, Doyer, DE (US); Robert Edward Jerman, Chalfont, PA (US); Charles Edward Wolanski, Bensalem, PA (US)

(73) Assignee: Markel Corporation, Plymouth Meeting, PA (US)

( * ) Notice: Subject to any disclaimer, the term of this patent is extended or adjusted under 35 U.S.C. 154(b) by 893 days.

(21) Appl. No.: 13/200,611

(22) Filed: Sep. 27, 2011

(65) Prior Publication Data

US 2013/0075321 A1      Mar. 28, 2013

(51) Int. Cl.
| | |
|---|---|
| *B01D 24/00* | (2006.01) |
| *B01D 27/00* | (2006.01) |
| *B01D 33/00* | (2006.01) |
| *B01D 25/00* | (2006.01) |
| *B01D 36/00* | (2006.01) |
| *B01D 63/06* | (2006.01) |
| *B01D 71/34* | (2006.01) |
| *B01D 71/36* | (2006.01) |

(52) U.S. Cl.
CPC ............. *B01D 63/061* (2013.01); *Y10T 29/53* (2015.01); *Y10T 29/49826* (2015.01); *B01D 71/34* (2013.01); *B01D 71/36* (2013.01); *B01D 2313/04* (2013.01)

(58) Field of Classification Search
CPC .. B01D 2313/04; B01D 63/043; B01D 63/06; B01D 2265/06; B01D 2313/025; B01D 2317/04
USPC ......... 210/323.1, 330, 340, 324, 232, 500.27, 210/500.36, 500.29, 321.8, 497.01
See application file for complete search history.

(56) References Cited

U.S. PATENT DOCUMENTS

| | | | | |
|---|---|---|---|---|
| 2,386,826 | A | * 10/1945 | Wallach et al. | ............... 210/640 |
| 3,228,876 | A |   1/1966 | Mahon | |
| 3,426,841 | A |   2/1969 | Johnson | |
| 4,177,031 | A | * 12/1979 | Thayer et al. | ................ 425/460 |
| 4,461,707 | A | *  7/1984 | Thayer et al. | ........... 210/321.79 |
| 4,539,113 | A | *  9/1985 | Tomita et al. | ............. 210/323.2 |
| 4,692,176 | A | *  9/1987 | Israelson | ......................... 55/302 |
| 4,713,174 | A | * 12/1987 | Zievers et al. | ................ 210/233 |

(Continued)

FOREIGN PATENT DOCUMENTS

EP          0601733 A1 * 11/1993 ............ B01D 29/33

*Primary Examiner* — Ana Fortuna
(74) *Attorney, Agent, or Firm* — Leslie A. Cohen

(57) ABSTRACT

A tubular membrane module and its method of manufacture are disclosed wherein tubular membranes form an interference self-sealing fit with hard tube sheets with the aid of a hard hollow mandrel inserted at the end of the tubular membranes. The tubular membranes are comprised of porous, compressible PTFE and/or fluorocopolymers. The self-sealing method described herein requires no heat treatment, allows for ease of manufacture without destruction of the tubular membranes and without the processing complexity of utilizing any additional potting agent, extrusion, or chemical cross-linking of any polymeric adhesives. The self sealing PTFE tubular membranes have superb chemical resistance and temperature resistance, and through the benefits of this invention, offer higher pullout resistance than typically observed with potting materials such as polyurethane and epoxy. In addition, the self-sealing method is reversible and non-destructive (whereas chemical potting and sealing methods using heat are not), as one can easily remove one or more damaged tubes and replace them.

27 Claims, 10 Drawing Sheets

(56) References Cited

U.S. PATENT DOCUMENTS

| | | | |
|---|---|---|---|
| 4,725,356 A * | 2/1988 | Zievers et al. | 210/323.2 |
| 4,749,031 A | 6/1988 | Fukumoto | |
| 5,066,397 A | 11/1991 | Muto | |
| 5,100,549 A | 3/1992 | Langeraki et al. | |
| 5,104,535 A | 4/1992 | Cote | |
| 5,131,666 A | 7/1992 | Hutchens | |
| 5,209,844 A * | 5/1993 | Zievers et al. | 210/232 |
| 5,211,728 A | 5/1993 | Trimmer | |
| 5,401,406 A * | 3/1995 | Johnson et al. | 210/323.2 |
| 5,511,831 A | 4/1996 | Barton | |
| 5,542,363 A | 8/1996 | Gamino | |
| 5,948,257 A * | 9/1999 | Custer et al. | 210/500.26 |
| 7,160,463 B2 | 1/2007 | Beck et al. | |
| 7,625,015 B2 | 12/2009 | Spiegelman | |
| 7,790,030 B2 * | 9/2010 | Schwartz et al. | 210/323.1 |
| 7,829,170 B1 | 11/2010 | Bowen | |
| 8,231,786 B2 * | 7/2012 | Stefanini | 210/650 |
| 2004/0175571 A1 | 9/2004 | Buerger | |
| 2005/0145556 A1 | 7/2005 | Beck | |
| 2012/0324845 A1 * | 12/2012 | Doehla et al. | 55/378 |

* cited by examiner

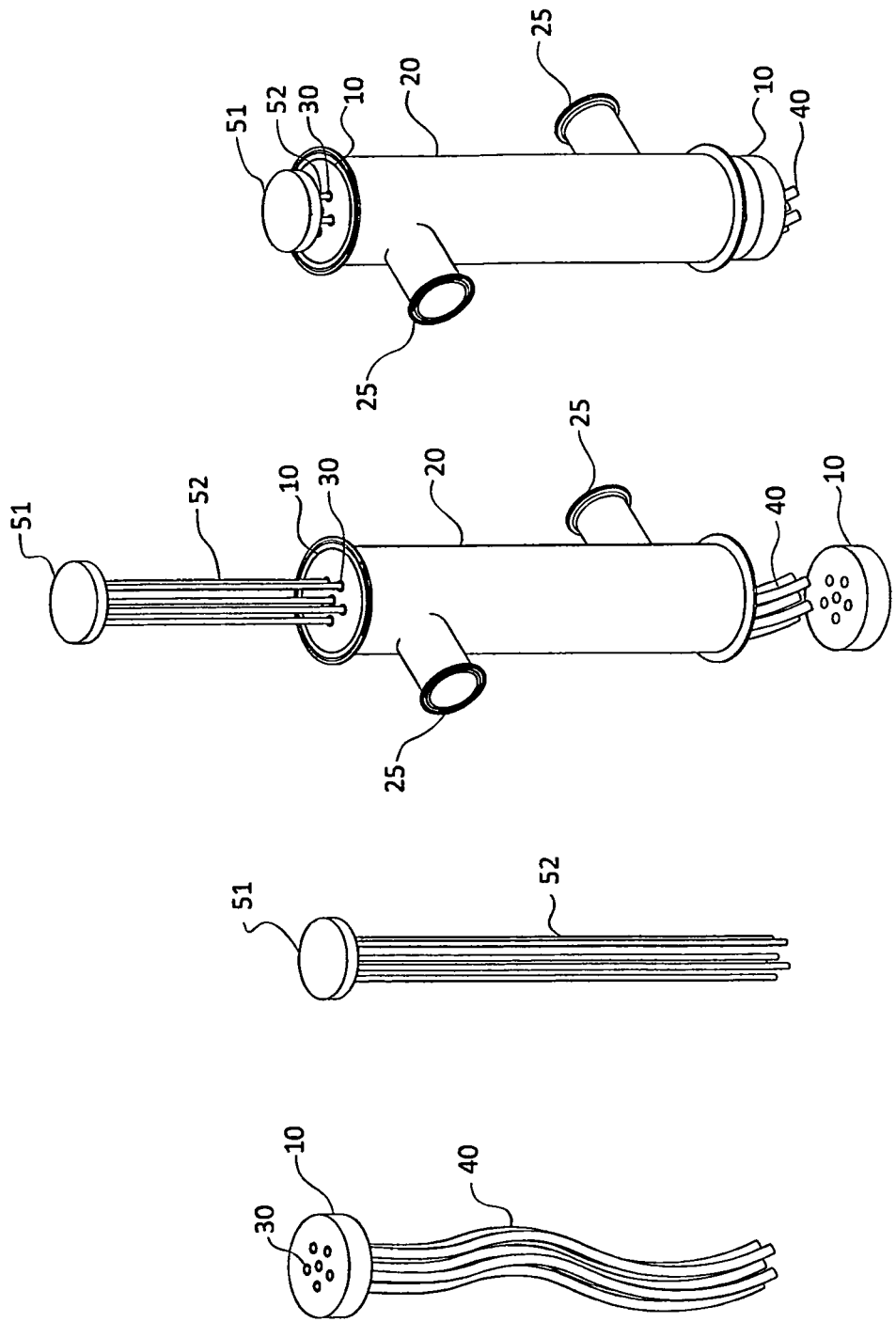

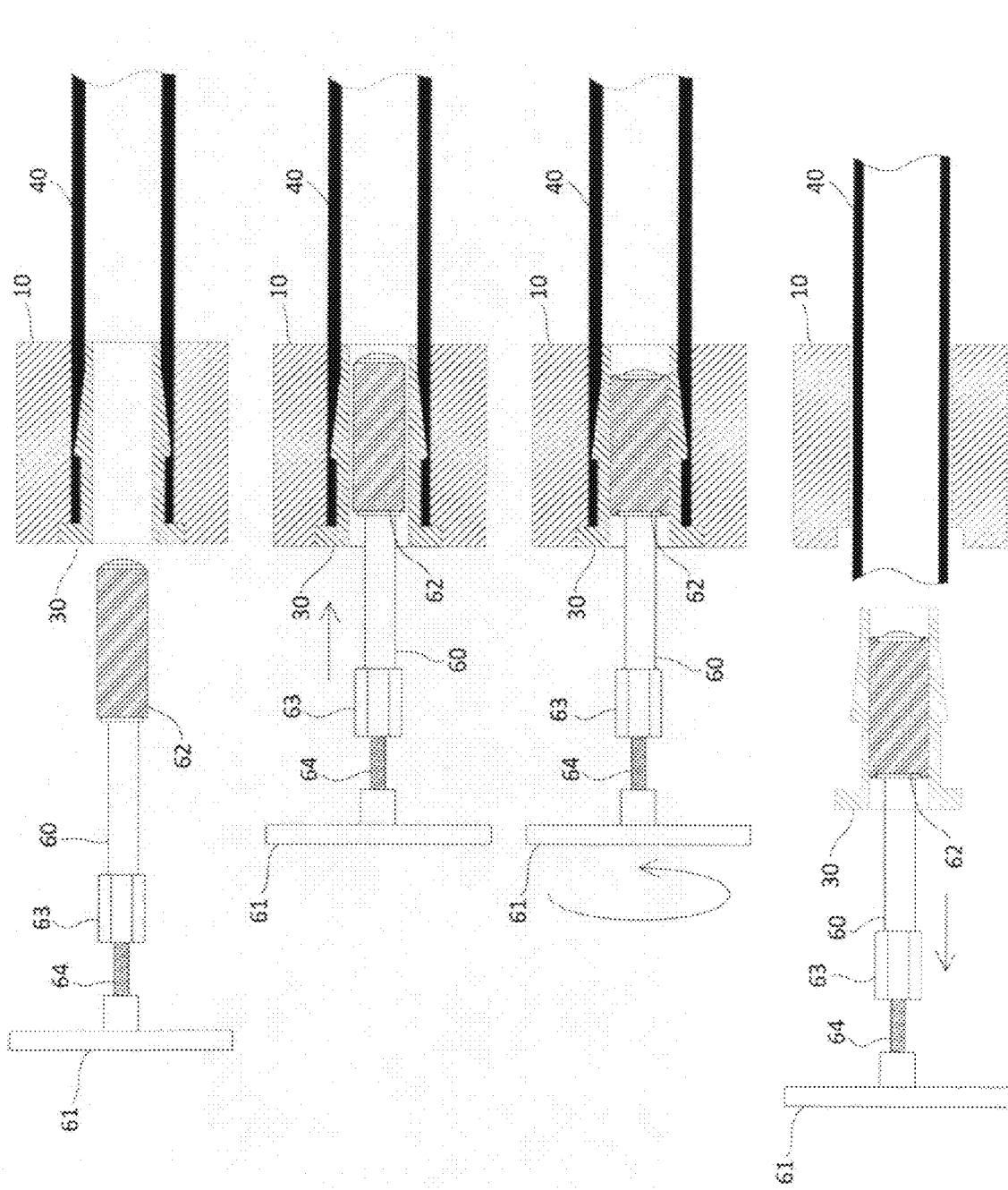

SELF SEALING MEMBRANE CONTACTOR WITH PTFE TUBULAR MEMBRANES

BACKGROUND

1. Field

This application relates to tubular membrane modules, specifically to the method of manufacturing such membrane modules, and even more specifically to the physical means of sealing the ends of the tubes to make suitable contactors with isolated or separated lumens.

2. Background of the Invention

Membrane contactors are useful devices for separation processes, contacting processes, or as filters. A membrane contactor consists of a membrane or membranes held in such a manner as to separate two regions of flow and enable the membrane to act as a separation means between the two phases, and a housing to enclose the membrane and contain and direct the flow of the multiple phases. The membrane acts as a barrier between the two fluid phases and selectively allows or prohibits the transport of one or more chemical species or particles from one fluid stream to the other. The housing has one or more ports to allow flow to and from the membrane. Membrane contactors can be considered as a subclass of the more general class of fluid or fluid/gas transport devices.

Membrane contactors have applications as filters, separation systems, or contacting devices in many industries such as chemical, pharmaceutical, food and beverage, environmental, water treatment, and semiconductor processing. Membrane separation processes such as gas/liquid separation or membrane distillation are replacing their bulk counterparts (distillation towers, stripping columns) due to improved energy efficiency, scalability, the ability to operate isothermally, and smaller physical footprints. In addition, membrane filters, separators, and contactors generally have no moving parts and are physically simple and rugged, resulting in low maintenance cost.

A membrane filter is a structure or physical device that employs a membrane to create a physical barrier that separates two phases and restricts the transport of particles, gels, bacteria, or viruses in a selective manner from one phase to another.

A membrane separator or contactor is a structure or physical device that employs a membrane to create a physical barrier, again separating two phases and allowing selective transport of one or more chemical species from one phase to the other. A membrane separator is a device in which one species is selectively removed from a fluid across a membrane barrier. A membrane contactor is a device in which one or more species are introduced into a fluid across a membrane barrier.

Hollow fiber and tubular membrane devices are a broad class of membrane modules that employ membranes in hollow fiber or tubular form. In general terms, either geometry consists of a membrane with a generally cylindrical shape, having an outer diameter, a hollow channel (also known as a lumen) opened axially down the center of the cylinder parallel to the major axis of the cylinder defining an inner diameter, ensuring a uniform membrane wall thickness (defined as the difference between the outer diameter and the inner diameter divided by 2) when measured both circumferentially and axially, with the hollow channel open on at least one of the two ends of the cylindrical membrane.

Hollow fibers and tubes are geometrically similar and the distinction between a hollow fiber and a tube is made in terms of the diameter of the hollow fiber or tube. The distinction is not a sharp one, and for the sake of this patent application we delineate a tube opposed to a fiber when the diameter of the hollow fiber approaches 2 millimeters and greater. The advantages of the two over other membrane geometries, specifically over membranes in sheet form, are similar.

While improved surface to volume ratio favors the use of smaller diameter hollow fibers, certain processes dictate the need for larger diameter tubes. Filtration systems that have high solids in the inlet streams require larger diameter tubular membranes to avoid becoming plugged. Generally these filtration systems are run in a cross flow manner, maintaining high velocities of the product to be filtered moving through the lumen of the membrane. The high velocity helps eliminate the build-up of a cake or solids on the membrane wall and thus shutting down the filtration process. High solids cross flow filtration applications are very common in the food and beverage industry, waste water systems, and other industrially important filtration processes.

While many types of membranes are available in sheet form, the ability to create significantly higher surface area per unit volume with a hollow fiber or tubular membrane is of major advantage to the designer and user of a membrane filter or contactor. A hollow fiber or tubular membrane is also typically self-supporting in contrast to flat sheet or thin film membranes that usually require a skeletal structure for support. In addition, typical contactor designs employing hollow fiber or tubular membranes, whether constructed as a cross flow element or in a dead-end configuration, offer more uniform flow and fewer regions for the flow to stagnate. In this patent application tubular membranes are employed, and typically a porous tubular membrane is employed, however the invention is not limited to porous membranes.

The usefulness and efficiency of a membrane contactor is determined by the available surface area of the membrane per unit volume of the device and the rate at which the transfer or removal of the species of interest occurs; this is generally governed by the flux (flow per unit area, per unit time, per unit pressure gradient) of the process stream. The available surface area for a hollow fiber membrane module is dictated by the packing density of the fibers (the ratio of the sum of the cross sections of the individual fibers to the total available cross sectional area). The higher the packing density and the greater the surface area to volume ratio generally results in a more efficient module.

Two other useful parameters for defining the performance of a porous membrane are the pore size distribution and the porosity. The pore size distribution is a statistical distribution of the range of pore diameters found in the membrane wall. The smaller the mean pore size, the smaller the particle a membrane filter will separate. The largest pore size can also be characterized by a measurement called a bubble point, which is defined as the pressure at which the first air bubble is observed escaping through a membrane wall on a fully wetted fiber. To perform a bubble point measurement, the fiber is wetted and flushed with isopropyl alcohol (IPA) to ensure that all the pores are filled with liquid and that there is no trapped air in the pores of the fiber. The fiber is then looped and immersed in a clear container of IPA with the two lumen ends above the level of the IPA. Air pressure is applied to the lumen ends in small increments until the first bubble of air is observed on the outside of the fibers. The resulting pressure is the bubble point pressure and is an indication of the largest pore in the fiber as the IPA in that pore is the most readily (lowest pressure) displaced by the incoming air pressure.

The porosity of a hollow fiber membrane may be defined as the percentage of free volume in the membrane, or for PTFE hollow fiber membranes, as $(1-\text{membrane density}/2.15) \times 100$ where 2.15 is the density of solid PTFE. The higher the porosity, the more free volume and generally the higher the flux rate through the membrane wall.

For a given pore size distribution, higher porosities are often desirable as they lead to higher flux rates. Unfortunately higher porosities also generally lead to softer membrane walls, causing the tubular membranes to be structurally very soft and prone to deformation and collapse, especially during any assembly process.

The elements of a tubular membrane contactor are the tubular membrane itself, the housing, and a means to secure the tubular membranes to a support structure at least one end of the housing and to the housing itself. A tubular membrane, the primary element of a tubular membrane contactor is a porous or non-porous, semi-permeable membrane of defined inner diameter, defined outer diameter, length and pore size, and generally of a very high aspect ratio, defined as the ratio of the length to the diameter of the fiber. A tubular membrane contactor is generally comprised of a plurality of tubular membranes assembled with at least one common feed to the open lumen ends isolated from a common discharge from the outside surfaces of the tubular membranes. There may be a common discharge for the lumens of the opposite ends of the tubular membranes isolated in a similar manner from the outside surfaces of the membranes.

The housing is an outer shell surrounding the membrane that secures and contains an assemblage of tubular membranes. The housing is equipped with one or more inlets and one or more outlets, such that the potted bundle of hollow fiber membrane acts as a barrier and separates the two phases or process streams. The design of the housing, and specifically the relationship of the inlets and outlets, regulates the flow of the process fluid into or out of the fiber lumens and directs the processed fluid away from the device. There are typically two common modes of designing the housing, which relate to how the fluids interact with the membrane. What are known to those well versed in the art as dead-end elements consist of a housing that directs all of the volume of one fluid to pass through the membrane walls to reach the discharge or exit of the housing. The dead-end design is a very common design employed for membrane filtration. For dead-end tubular membrane filters, both ends of each tubular membrane are bound at one end of the housing. In dead-end tubular membrane filters the process fluid either enters the lumens of the tubular membrane and discharges out through the walls of the tubular membrane, or enters through the walls and discharges out of the lumens. In either case, this ensures that the entire process stream passes through the membrane wall.

A dead-end tubular membrane filter configuration is contrasted to a cross flow configuration in which the lumens are open at both ends, and only a portion of the process stream entering the upstream lumens passes through the membrane wall, while the remainder of the fluid discharges through the downstream lumen openings. The portion of the fluid discharging from the downstream lumen end may be passed along to another membrane element, recycled to the beginning of the unit, or discarded. The cross flow configuration mode is employed with both filtration as well as membrane contacting or separation processes.

A tubular membrane bundle may be integral to the housing or may be designed so that the membrane bundle may be installed and removed. The composition of the cylindrical containment shell can be perfluorinated homopolymers of PTFE, fluorinated homopolymers of PVDF (polyvinylidene fluoride), perfluorinated co-polymers of TFE/HFP, TFE/PPVE, TFE/CTFE, TFE/Alkoxy, and partially fluorinated co-polymers of Ethylene/TFE, Ethylene/FEP, and similar materials, or other chemically resistant resins such as PVC, Polysulfone, Polyethersulfone, Polycarbonate, PEEK, PEK, Polyamides, or Polyimides. Or, the cylindrical containment shell can be composed of stainless steel, carbon steel, other polymeric materials, or organic and inorganic composites.

Membranes for contactors or filters have been developed from a variety of synthetic polymers and ceramics and have been known in the industry for many years. While ceramic membranes offer the chemical resistance and high service temperature required by aggressive acidic, alkali, or organic solvent applications, in their present-day state they are very fragile, very expensive, and very difficult to work with, a combination of features that keeps ceramic membranes out of many applications.

The vast majority of state of the art polymeric membranes are limited as they are not inert, they possess inadequate chemical purity, thermal stability and chemical resistance, and occasionally have undesirable surface properties, preventing their use in certain important applications. This is because these very same membranes are spun from solution, and the fact that they must be soluble in certain solvents to convert to a membrane means that the final membrane itself is susceptible to attack by those same classes of solvents.

It has long been desired to be able to have membranes manufactured from fluorinated or perfluorinated resins due to their high service temperatures, chemical stability, inertness, and chemical resistance to a wide range of solvents, acids and alkali systems. However, membranes produced from non-fully fluorinated polymers still require aggressive solvent systems and very high processing temperatures to manufacture, increasing cost and generating environmental and waste issues. Membranes manufactured from Polytetrafluoroethylene (hereafter referred to as PTFE) are most desirable because, as a fully fluorinated polymer (with no C—H bonds on the polymer chain backbone), they offer the best combination of thermal and chemical stability of all the fluorinated and perfluorinated resins commercially available. In addition, the method by which they are converted to membranes does not employ hazardous solvent systems; instead using a stretching and orientation method.

It is also desirable to have membranes manufactured from fluorinated or perfluorinated resins, especially fully fluorinated resins, due to their low surface energy. Filtration of organic liquids, separating organic from aqueous systems, or removing vapor from aqueous systems all favor low energy membranes. PTFE offers the lowest surface energy of all the fluorinated or perfluorinated polymeric membranes with a surface energy of less than about 20 dyne-cm.

The membrane material discussed in this patent application, PTFE, a member of the fluoropolymer family, offers significant advantages over non-fluoropolymeric synthetic resin membranes. PTFE possesses extraordinarily high service temperatures. PTFE is chemically clean and inert and resistant to attack by acids, alkalis, and a very wide range of organic chemicals and solvents, and can be fashioned into a very physically strong membrane either as a flat sheet or hollow fiber or tube. Commercial interest in PTFE membranes runs high due to the above stated properties along with its hydrophobic surface, making it ideal for certain isolation operations. PTFE membranes also offer the best thermal stability and chemical resistance in the general class of fluoropolymers, making them the ideal choice for a membrane material. Furthermore, PFTE is a soft material with high compressibility. This allows for the novel use of PFTE as a self-sealing gasket as will become more apparent in this patent application.

It is widely known in the field of membrane construction that a major challenge with the use of hollow tube membranes lies in obtaining a robust seal around each tube when assembling the tubes into a contactor or module. The material used to create the seal between the tubes must: bind the tubes, seal and isolate the lumen-side face of the tubes from the downstream tube surface, and prevent the fluid being filtered or contacted from bypassing the membrane surface. The process by which the sealing material is introduced to the tube bundle is critical, as significant force or pressure will damage, collapse, or crush the individual hollow tubes, rendering the module far less effective or useless. PTFE as a membrane poses additional difficulties trying to affix it in a leak proof manner to a surface as the PTFE does not melt, and because of its high surface energy very few materials will adhere to its surface, making it difficult to glue or bond into place.

For small diameter hollow fibers, a process known as potting is often employed. Potting the hollow fiber membranes may occur prior to, or during the operation of mounting the hollow fiber membranes into the housing. To bind the ends of the hollow fibers to one another, a potting compound is employed. A potting compound is a material that when applied around the ends of hollow fibers, bonds them together into a solid, cohesive mass that isolates and fixes the hollow fibers from the remainder of the bundled assembly of fibers.

Traditional potting techniques fail with larger diameter tubular membranes for many reasons. The lower packing density resulting from larger diameter tubes leaves significant interstitial voids between the tubes that are extremely difficult to fill with a potting system. Even if the voids are successfully filled, it creates a weak point due to the different physical properties between the tubular membrane and the potting compound. The larger diameter tubular membranes would flex under pressure, pulling away from and loosening the potting compound in these large regions. Unless the potting compound creates a very strong bond with the wall of the tubular membrane, the soft nature of the membrane allows the wall to be pushed in and away from the bulk of the potting compound, generating a point of failure.

Larger tubes are harder to melt or soften, which facilitates bonding tubes to one another; this eliminates many of the fusion techniques identified in the literature for smaller tubes. Because the tubular membranes are larger diameter and soft, they tend to deform under any applied pressure during assembly. Along with these general limitations for any larger diameter polymeric tubular membrane, there are significant challenges in working with fluoropolymeric tubular membranes in general and PTFE specifically. It is nearly impossible to glue PTFE tubes to other surfaces, and if successful, due to the larger diameter, the tubes will easily pull away from the bonded surface. The larger the diameter tube, the more likely that the soft wall will be able to be stripped from the bonding surface due to the decreased surface area/cross sectional area ratio with larger diameter tubes.

In addition, potted bundles of larger tubes have structural weaknesses (which increase as the hollow fibers increase in diameter) due to increased void volume in the potted ends. This leads to additional cost and processing issues. Consequently, an alternative and effective means to isolate or mount large tubes in a contactor has been a long time endeavor in the industry.

Typically, contactor designs for tubular membranes have employed some sort of tube sheet design, similar to that employed for assembling heat exchangers. In a tube sheet assembly, the ends of the individual tubes are pulled or pushed through a series of holes drilled into a flat sheet or plate. Once the end of each tube is placed in the tube sheet, the ends of the tubes are sealed in place. For heat exchangers, where both the tubes and tube sheets are typically metal, these ends may be flared, welded, soldered, or crimped into place. Compression fittings that rely on the rigidity of the tube are often employed as well.

For rigid plastic tubes, some of these same techniques are known. Certain plastics may be welded or bonded via adhesive to a tube sheet to create a leak proof assembly. Polymeric membranes, recognized herein, tend to be softer materials and would not be described as rigid, and thus would not be suitable for crimping or compression methods mentioned above. Any compressive force on the outside of the membrane tube would cause it to crush.

Some manufacturers have had to resort to mounting the tubular membrane on a support structure or skeleton to facilitate mounting the membrane and sealing against the tube sheet. This practice is time consuming and very expensive.

It has been stated herein that there is a strong need for membranes produced from fluoropolymers due to their high service temperature, outstanding chemical resistance, hydrophobicity and other desirable properties. It has also been established that these same desirable physical properties from the standpoint of membrane properties also render the fluoropolymer membrane extremely difficult to glue or bond to other materials. This inability to easily glue or bond combined with the softness of the membrane creates a difficult problem when assembling or mounting tubular membranes into a contactor or filter.

It is the object of this invention to overcome the stated limitations for fluoropolymeric tubular membranes in general and PTFE tubular membranes in particular and provide a method for rapid and economic assembly of tubular membranes into contactor and filter modules. The method of this invention offers the following important advantages to the tubular membrane contactor designer: Rapid and economic assembly and adaptable to very large contactors; Reversible to remove damaged tubular membrane(s); Leak proof under a variety of temperatures and pressures; No voids, or dead space where flow can stagnate or debris can accumulate; No interruption in the contour of the inside wall of the membrane as it passes into the tube sheet.

The posited challenges and commercial demands of fixing and isolating tubular membranes have been solved in this patent application. We have invented a physical technique, or method, to reliably and rapidly seal and isolate the soft hollow tubes in a tube sheet with the hollow tubes acting as self-sealing tight fit gaskets. The presented self sealing method herein overcomes all the challenges listed above by not requiring the tube wall to be heated or softened and by not utilizing any additional materials that could contaminate or diminish the chemical resistance of the fluoropolymer hollow tubes. This is accomplished by a physical means of an interference fit locking the hollow tubes into a tube sheet by the insertion of a hard hollow mandrel at the end of the hollow tubes (after insertion and pulling the hollow tubes into the tube sheet). In this patent application, the hollow tubes perform as the actual sealing material as they act as self-sealing gaskets due to the compressibility of the PTFE.

PRIOR ART

In the art of interference or physical fits, Barton (U.S. Pat. No. 5,398,981 and U.S. Pat. No. 5,511,831) claims an interference fit between two hard tube joints. It is inferred that the joints consist of metal materials or at least hard materials and in fact, the specification states the materials have to be soldered, brazed, or welded. There is no claim for an interference fit of a soft material to a hard material, or to the use of plastics. In addition, the female member must have a flared end. A soft or elastic material cannot receive a flare.

In the Barton CIP (U.S. Pat. No. 5,511,831), additional adhesive is claimed; no doubt, due to the poor seal of the hard metal male and female members claimed in U.S. Pat. No. 5,398,981. In the patent application stated herein, the interference fit is between a soft compressible polymeric material (PTFE) and the hard plastic PVDF tube sheet aided by an insertable hollow mandrel that fits into the end of the hollow tubes. In this patent application, we prefer the hard tube sheet to be comprised of a hard machinable chemically resistant plastic such as PVDF or stainless steel. However, the tube sheet can consist of any number of hard materials such as ceramics or polymer alloys.

In U.S. Pat. No. 5,104,535, Cote et. al, Aug. 17, 1990, "Frameless Array of Hollow Fiber Membranes and Module Containing a Stack of Array" utilizes a potting method by way of a physical means. However, the physical means in Cote is the clamping of the tubes on the outside of the hollow tubes, and this method would crush and damage the soft PTFE tubes that we use in this patent application.

In U.S. Pat. No. 5,211,728 and U.S. Pat. No. 5,013,437, Trimmer, issued May 19, 1993 and May 7, 1991, respectively, titled "Clam Shell Retainer Used in Hollow Fiber Membrane Device" uses a radial screw on method as the physical means to put an end cap onto the tubes. Although, in the Trimmer method, the hollow tubes are not potted, and the end-cap is peripheral to the outer part of the clamshell.

It is also known in the art that various adhesives such as epoxies, polyurethanes, cyanoacrylates, etc. have been used for bonding (potting) the ends of hollow tubes together into an integral assembly (for example, H. Mahon U.S. Pat. No. 3,228,876). But the methods utilizing these potting adhesives suffer from serious limitations. For example, the adhesion of epoxies, cyanoacrylates, and polyurethanes to fluoropolymer tubes, in general, and PTFE in particular, is limited, as the assemblies suffer from habitual fiber pullout and failure due to pressure and thermal cycling. Furthermore, materials such as epoxies, polyurethanes, cyanoacrylates, etc. suffer from limited chemical and thermal stability, thus greatly limiting the rigorous types of applications for PTFE hollow tubes.

Muto et al. (U.S. Pat. No. 5,066,397) teaches a method for assembling thermoplastic hollow fiber membranes via a fusion process. In the Muto fusion process at least one set of the ends of the hollow tubes are bundled together and heated above the softening point of the hollow tubes allowing the ends to form into a solid end terminal block. This method overcomes the limitations of using adhesives such as epoxies and polyurethanes as outlined above, but suffers from other limitations that render it unsuitable for PTFE hollow tube membranes. For example, the Muto manufacturing method, while possibly suitable for certain thermoplastic hollow tube membranes, is not suitable for PTFE hollow tube membranes, as PTFE will not fuse with itself unless exposed to temperatures in excess of 340° C. and very high pressures (greater than 50 bar). Exposure to said extreme temperatures and pressures would crush the soft PTFE tubes and destroy the porous structure, thus rendering the finished module useless.

Spiegelman et al. (U.S. Pat. No. 7,625,015) relies on a method to avoid the use of epoxies, and other foreign resins or adhesives with the use of PTFE tubes that could contaminate the process, or decompose at high process temperatures, or when exposed to aggressive process chemicals. Spiegelman et al. teaches the use of a connector with a series of pre-drilled holes through which the tubes are placed and then crimped in place via an external-swaging ring. However, a major limitation of the Spiegelman method of mounting and sealing with a tight clamp is the crushing of the pliable tubes. In the self sealing method herein, no unsupported radial force is applied that could damage the hollow tubes, and the self sealing method provides a tight physical interference fit that results from the insertion of a hollow mandrel at the ends of the hollow tubes placed into the tube sheet.

The superior self sealing method stated herein also has advantages over Muto, Cote, and Spiegelman as it is a more gentle process, does not require heat treatment, and it does not lead to the crushing of the tubes. The self-sealing method also does not result in tube contamination, as does potting methods using epoxies, polyurethanes, cyanoacrylates, and other non-fluoropolymer chemical potting agents. In addition, the self sealing method is reversible and non-destructive (chemical and sealing methods using heat are not), as one can easily remove one or more damaged tubes and easily replace them using the same self sealing method without damaging other tubes.

It should be mentioned that Hutchens (U.S. Pat. No. 5,131,666) discusses PTFE as a packing material where metal rings are applied to press PTFE into an interference fit. However, "U.S. Pat. No. 5,131,666" is totally different from our invention as the "Hutchens" interference fit is not used for hollow membrane fibers in contactors and does not incorporate the necessary steps used in our invention to achieve the finished contactor product.

There are many commercial demands for an improved potting or hollow tube sealing method that have not yet been satisfied particularly for larger tubular membranes. The ideal potted or tube isolated end must have long lasting and robust seals between the potting medium and the hollow tubes: the tubes must have strong adhesion to the potting compound and or tube sheet so that the tubes cannot be pulled or pushed out under the temperature and pressure cycles of normal operation. A potting or tube isolation method is needed that does not destroy, distort, deform, or otherwise damage or hurt the integrity of the hollow tubes. If the hollow tubes are collapsed or distorted, a flow restriction results, and the ensuing module is less efficient. If the hollow tube is collapsed or damaged, leakage can occur under subsequent operation, resulting in a defective module. A distorted hollow tube may not fully bond with the potting material, resulting in a flow path between the tube wall and the potting compound, or between the tube and shell, or potting material and shell, resulting in a leak and a defective module. The ideal potting material or the material used for tube isolation must be of a nature that it's thermal resistance, chemical resistance, and chemical composition do not limit the use of the hollow tubes or the benefits of the potting system or method will be limited. The material used to make the seal must be chemically robust and chemically and physically compatible with both the hollow tube membranes as well as with the fluids used in the application.

SUMMARY OF THE INVENTION

We have invented a physical technique, or method, to reliably and rapidly seal and isolate the soft hollow tubes together in a tube sheet with the hollow tubes themselves acting as self sealing tight fit gaskets. The method described herein also offers the advantages of not requiring adhesives or bonding agents that potentially can act as contaminants in the use of said membrane filter or contactor. Nor does the method described herein rely on melting the tubular membrane, either to other membranes or to the tube sheet itself.

The invention described herein relies on the compressible nature of the tubular membrane itself, many of the desirable physical properties of fluoropolymers in general and PTFE in particular to affect a physical seal in the tube sheet. A tube sheet chosen from a suitably hard material is drilled with a series of holes to accommodate the tubular membranes. The tubular membrane is inserted into the hole in the tube sheet. Once through the tube sheet, a hollow mandrel of suitable material is inserted into the tubular membrane. Once in the tubular membrane, the tubular membrane and hollow mandrel are pushed into the tube sheet. Through the design of the hollow mandrel, the tubular membrane is compressed between the outer surface of the tubular membrane and the inner wall of each hole in the tube sheet.

The design of the mandrel may vary, but crucial for any embodiment is that both the material of the insertable hollow mandrel and the material from which the tube sheet is constructed is harder than the tubular membrane. In this way, the tubular membrane is compressed between the two harder surfaces, resulting in a resilient, leak proof seal between the tubular membrane and the tube sheet.

Also key to this invention is the compressible nature of the tubular membrane. Membrane materials that are brittle, friable, or otherwise incompressible will generally not provide a good seal when compressed between the hollow mandrel and the wall of the bores in the tube sheet.

In terms of compressing a solid we use here the thermodynamics and fluid mechanics definition as compressibility being a measure of the relative volume change of a solid or plastic as a response to a pressure (or mean stress) change under adiabatic conditions. The inverse of the compressibility is known as the bulk modulus. PTFE with high porosity is very compressible and can undergo a large reversible volume change when stress is applied.

For the purposes of this invention, we use the term compressible to refer to the degree of compression or compaction that one obtains from a porous material placed under load. While not a strict requirement for this invention (for example silicone tubing is employed as a non-porous membrane, but is compressible, and this applies equally to other elastomers), it is advantageous for the tubular membrane to be porous and compressible with some degree of recovery. Recovery is defined as the ability of the compressed material to partially or completely return to its original state following removal of the compressing load. We follow the definitions developed in ASTM F36-99, "Standard Test Method for Compressibility and Recovery of Gasket Materials". While the ASTM F36-99 test represents only short term values and does not contemplate compression and recovery over extended time periods, the definitions of compression and recovery are useful for defining desirable membrane criteria for this invention.

Qualitatively, the compression measured using the F36-99 test consists of preparing a test specimen of a given size, measuring the initial thickness of the specimen, pre-loading the specimen followed by again measuring the thickness, subjecting the specimen to a fixed load for a fixed duration of time followed by measurement of the thickness under load, and finally release of the load and measuring the degree of recovery.

For the purposes of this invention, the compression is important as it closes off the pore structure of the membrane and forms the seal around the insertable mandrel. The ability of the membrane to recover is important as it helps to maintain intimate contact between the hollow insertable mandrel and the wall of the bores in the tube sheet.

As measured by ASTM F36-99, compression for porous PTFE tubular membranes may range from a low of 15% for low porosity membranes to a high of 70% for high porosity membranes, with recoveries of 30% to 80% depending on density, wall thickness, and the details of the pore structure. These values exemplify the test and are not presented as representing the limits of compressibility or recovery for either porous PTFE tubular membranes or requirements for this invention. The nature of the pore structure, the type of PTFE resin employed, the variation of pore size distribution as well as any asymmetry in pore structure across the wall thickness will impact both the compressibility and recovery of the porous structure under load.

The insertable hollow mandrel that helps compress the porous PFTE tubular membranes and lock the tubes into place in the tube sheets are typically stainless steel. However, they can be made of other machinable hard metals, or hard plastics or composites. The insertable hollow mandrel can be of multiple designs; here we use a frusto-conical design. The specific designs of the insertable hollow mandrel are not limited to those stated herein; many other insertable hollow mandrel designs can be envisioned incorporating the need for ridges and an outer flange as well as the imagination of the designers. Common to any design of a hollow mandrel are certain attributes that are necessary and desirable to establish a robust seal with the tubular membrane. The insertable hollow mandrel should have one or more ridges (as observed in 32 in FIG. 4) cut circumferentially into the part. These ridges provide the compression of the tubular membrane against the tube sheet wall. Of course, the insertable mandrel must be hollow, so as not to block the transport of material through the hollow tubes.

The tube sheets herein are comprised of a hard machinable plastic such as PVDF. However, other hard machinable plastics or hard machinable metals can be also be used. The tube sheets can be produced from any suitable polymer or other material that is harder than the tubular membrane and preferably softer than the insertable hollow mandrel.

To optimize the seal and assembly, it is essential that the apex of the insertable hollow mandrel be smaller than the hole of the tube sheet such that when the tubular membrane is pulled over the mandrel, the combined outer diameter of the mandrel with the tubular membrane is larger than the diameter of the hole in the tube sheet. When the tubular membrane and the insertable hollow mandrel are pressed into the tube sheet the soft tubular membrane wall is compressed tightly and locked into the gap between the apex on the insertable hollow mandrel and the tube sheet. The diameter of the insertable hollow mandrel is required to be less than twice the wall thickness of the compressed membrane tube. The diameter of the insertable hollow mandrel is required to be less than the diameter of the tube sheet minus twice the wall thickness of the compressed membrane tube.

Larger diameter hollow tubes can be used in this invention, and in fact this method is most preferred for use with larger diameter tubes. Typical tube diameters are from around 2 millimeters to around 50 millimeters. Even larger diameter tubes are from around 12 mm up to around 50 millimeters. The larger hollow tubes are preferred for high solids applications, as they don't plug up as easily or as fast as smaller diameter tubes. In terms of a lower limit in respect to the diameter of the tubes, as the hollow tubes become smaller in diameter, it becomes more difficult to machine a stiff enough insertable hollow mandrel to fit into the tubes. In addition, once the insertable hollow mandrel becomes too small in diameter, it loses its structural integrity, its stiffness, and it is not able to aid in the compression of the tubes.

BRIEF DESCRIPTION OF THE DRAWINGS

The operation of the present invention should become apparent from the following description when considered in conjunction with the accompanying figures, in which:

FIGS. 5, A-5D: Cross section of tube sheet showing assembly sequence with tubular membrane and insertable hollow mandrel.

FIGS. 8A-8D: Assembly sequence showing tubular membranes mounted on one tube sheet (FIG. 8A), the alignment tool (FIG. 8B), the alignment tool inside the housing (FIG. 8C), and the placement of the second end cap (FIG. 8D).

FIGS. 9, A-9D: Operational sequence showing extraction tool (FIG. 9A), insertion of extraction tool into insertable hollow mandrel (FIG. 9B), gripping the insertable hollow mandrel (FIG. 9C), and extraction of insertable hollow mandrel (FIG. 9D).

DETAILED DESCRIPTION OF THE INVENTION

This invention provides a simple, fast, and reliable method for producing a membrane contactor. The contactor is comprised of a plurality of tubular membranes produced from a compressible polymer membrane in general, or in particular compressible porous polymer membranes, or more specifically porous membranes constructed from fluoropolymers, or even more specifically compressible porous polytetrafluoroethylene membranes. This invention employs a novel, reversible, self-sealing method comprising of an insertable hollow mandrel and tube sheet design to seal the ends of the tubes and mount them in a contactor housing. The invention further provides for the membrane contactor or filter module made by the inventive method.

The concept of the design relies on the structure of the insertable hollow mandrel combined with the compressible nature of the polymeric membrane. The compressible nature of the membrane allows the membrane wall to be compressed to a degree without damage, and to partially recover. This compression between the insertable hollow mandrel and the tube sheet allows the membrane itself to become the integral seal between the insertable hollow mandrel and the tube sheet wall.

The tubular membranes used in this invention are produced from polytetrafluoroethylene homo- or co-polymers, but the technique is applicable to any polymeric tubular membrane whose walls are at least partially compressible.

The porosity of a porous membrane tube may be described relative to the density of the neat resin employed to make the membrane as follows: % Porosity=100×(1−(density of membrane/density of neat resin))

The tube sheets used in this invention are produced from any suitable polymer or other material that is harder than the tubular membrane and preferably softer than the insertable hollow mandrel. The insertable hollow mandrel is produced from any suitable polymer, polymer composite, or metal that is harder than the tubular membrane and generally harder than the tube sheet material. Generally speaking one would not want the insertable hollow mandrel to deform, but rather the tubular membrane to compress between the two harder surfaces of the tube sheet and the insertable hollow mandrel. While the tube sheet may be harder than the insertable hollow mandrel, this combination runs the risk of possibly damaging the tubular membrane on assembly or deformation of the insertable hollow mandrel on assembly or over time.

The terms "hard" and "soft" are defined herein in a relative manner in regards to solid materials utilizing several measures of resistance to indentation, deformation, or abrasion. One such measurement is the Durometer hardness test. The solid materials are always compared as being either softer or harder using the same ASTM D2240-00 Durometer scale.

Figure 1:
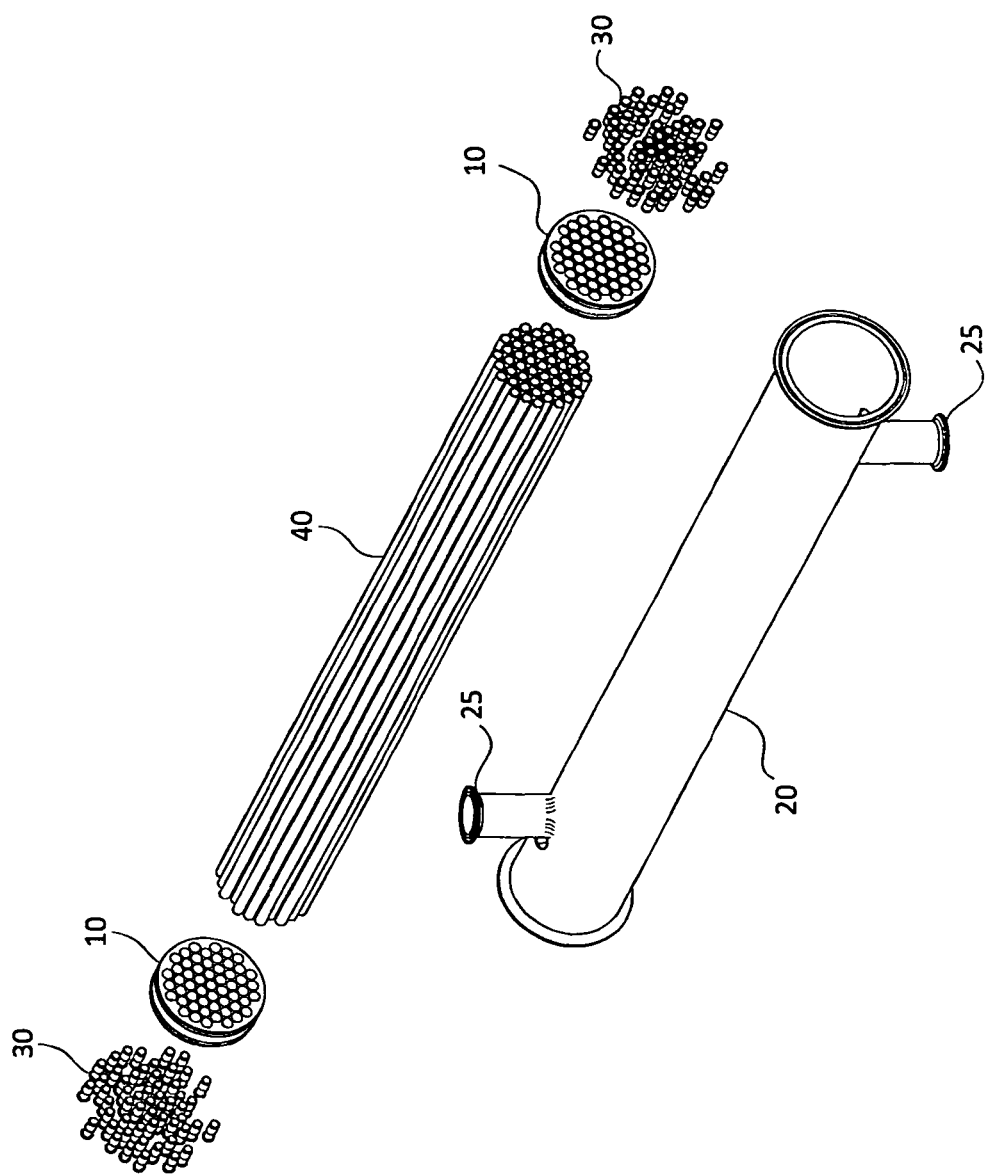
FIG. 1: Exploded view of housing, tubular membranes, tube sheets, and insertable hollow mandrels.

The key elements used to assemble a contactor or filter module employing the self-sealing tube design are shown in an exploded view in FIG. 1. The elements consist of one or more tubular membranes 40, one or more tube sheets 10, a suitable housing 20 designed to accommodate a tube sheet 10 in either end, and an insertable hollow mandrel 30 for each end of the tubular membranes 40 that penetrate the holes 14 in the tube sheet 10. The housing is fitted with one or more ports 25 through the wall of the housing 20 to allow discharge of flow that has passed from the inside channel of the tubular membranes and through the membrane wall. Conversely the flow may enter one or more of the ports 25 in the wall of the housing 20 and penetrate the walls of the tubular membrane 40 and discharge through the central channel of each of the tubular membranes 40.

Figure 2:
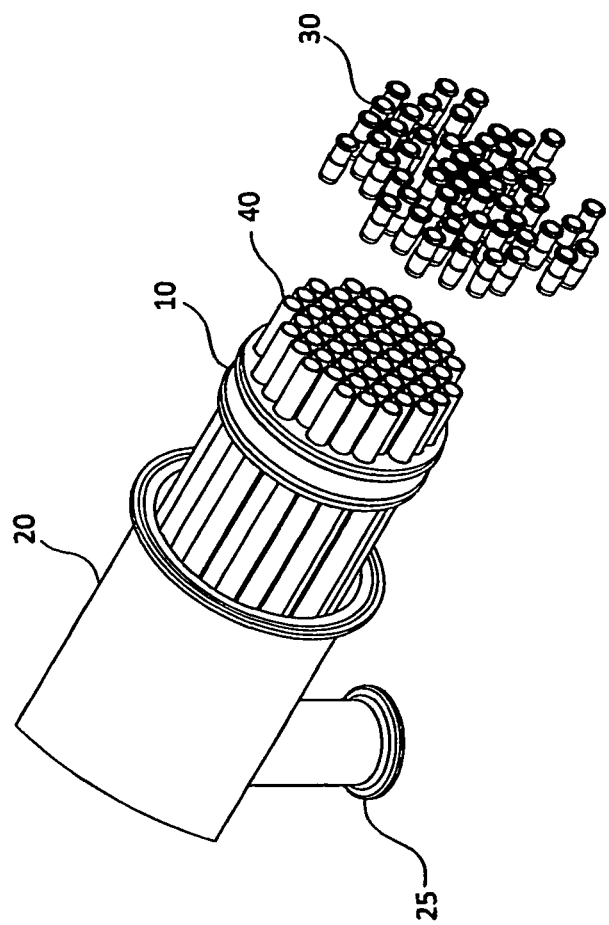
FIG. 2: Close up of one end of the housing showing exploded view of tube sheet, tubular membranes, and insertable hollow mandrels.

FIG. 2 is an enlargement of one of the tube sheet ends showing the relationship between the housing 20, the insertable hollow mandrels 30, the tubular membranes 40, and the tube sheet 10.

Figure 3C:
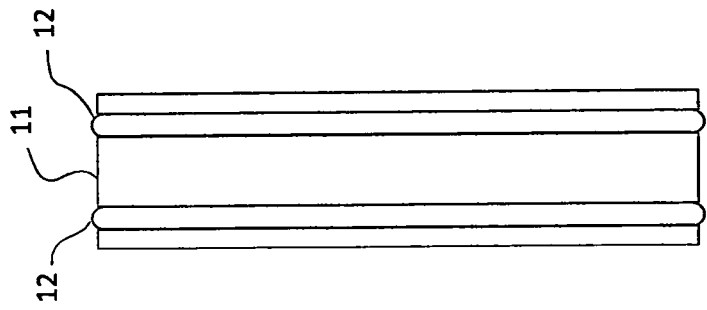
FIGS. 3A, -3C: Front view of tube sheet showing bores (FIG. 3A), and side profile views of the tube sheet showing channels for O-rings (FIG. 3B), and location of sealing O Rings in said channels (FIG. 3B).
Figure 3B:
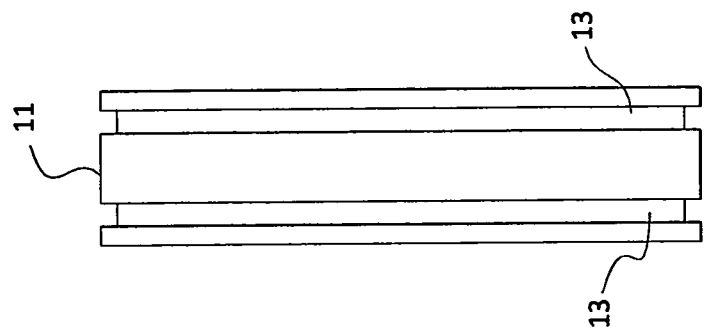
Figure 3A:
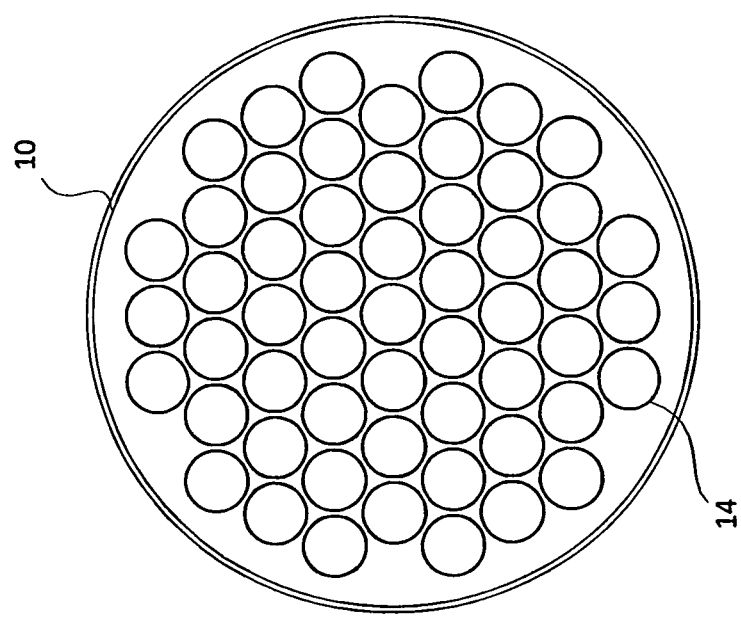

To produce a contactor or filter module using the self-sealing tube design, one starts with a tube sheet 10 shown in cross section and profile in FIG. 3A that has been machined to fit snugly within the contactor or filter module housing 20. The tube sheet 10 must be able to be attached to, and sealed into the housing 20 after the tubular membrane mounting steps are complete. This sealing may be accomplished by application of a suitable adhesive around the perimeter 11 surface of the tube sheet 10 FIG. 3B or through the use of an O-ring seal or seals 12 FIG. 3C mounted in channels 13 on the tube sheet 10. The adhesive would act as both a seal and a means of attaching the tube sheet 10 to the housing 20 while the use of O-rings would require an additional means of fixing the tube sheet to the housing. Such fixing means, to attach the tube sheet to the housing can include, but are not limited to, the use of a spanner ring on the outside of the tube sheet, retaining pins inside the housing, or a series of screws through the housing wall into the tube sheet. In addition, there are other fixing or sealing means that have various limitations that are known to those practiced in the art.

The tube sheets 10 for the given contactor or filter module design are drilled with a series of holes 14 to receive the tubular membranes. These openings in the tube sheet 10 may be counter bored to provide a flush surface on the tube sheet 10 once fit with the insertable hollow mandrel 30. The holes 14 for the tubular membranes are arrayed in a pattern dictated by the design of the contactor or filter module but are generally arrayed in a uniform pattern across the face of the tube sheet face 10. The spacing between the holes 14 is dictated by the size of the outer lip or flange on the insertable hollow mandrel, the diameter of the countersink if any, and the nature of the application. The number of holes determines the packing density of the tubular membranes. The packing density is defined as the sum of the individual cross sectional areas of the tubular membranes 40 divided by the available cross sectional area of the opening of the housing 20 expressed as a percent. The holes 14 may be cylindrical in shape, but may also have tapered walls, or be cut from other geometries to better fit the insertable hollow mandrel. Tapered walls facilitate a tight fit for the insertable hollow mandrel 30.

Figure 4A:
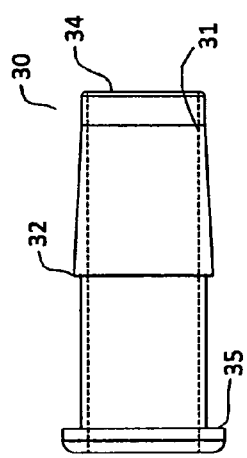
FIGS. 4A-4D: Various design possibilities for the insertable hollow mandrel including a design with a single ridge (FIG. 4A), a design including two ridges (FIG. 4B), a design including seven ridges (FIG. 4C), and one design with a protrusion at the end of the fitting (FIG. 4D).
Figure 4B:
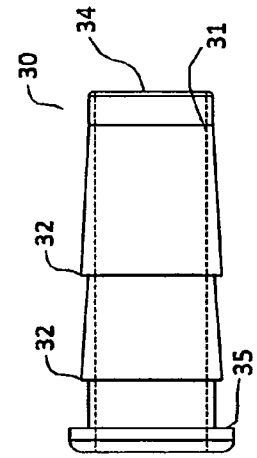
Figure 4C:
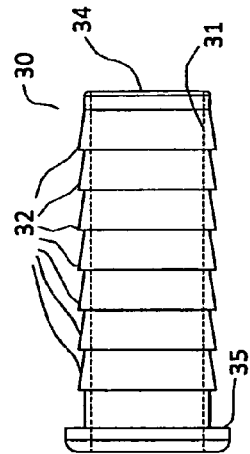
Figure 4D:
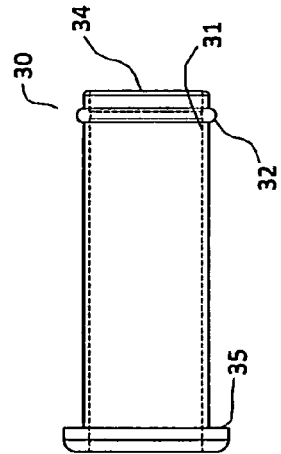

Several designs for insertable hollow mandrels are shown in FIGS. 4A-4C. Common to any design of a mandrel are certain attributes that are necessary and desirable to establish a robust seal with the tubular membrane. The insertable mandrel should have one or more ridges 32 cut circumferentially into the part. These ridges provide the compression of the tubular membrane against the tube sheet wall. FIGS. 4A, 4B, and 4C have one, two, and seven ridges 32, respectively. FIG. 4D has a single ridge 32 cut into the mandrel at the end of the mandrel. This design ensures that the seal between the mandrel 30 and the tube sheet 10 is made just as the tubular membrane 40 enters the tube sheet 10, eliminating any possibility of dead spots between the tubular membrane wall and the tube sheet wall. The specific designs of the insertable mandrel are not limited to those stated herein; many other IM designs can be envisioned incorporating the need for ridges and an outer flange as well as the imagination of the designers. A functional IM design is based on the inventive principles defined above including the delineated compression means that ultimately results in the physical fluid tight seal.

Figure 6:
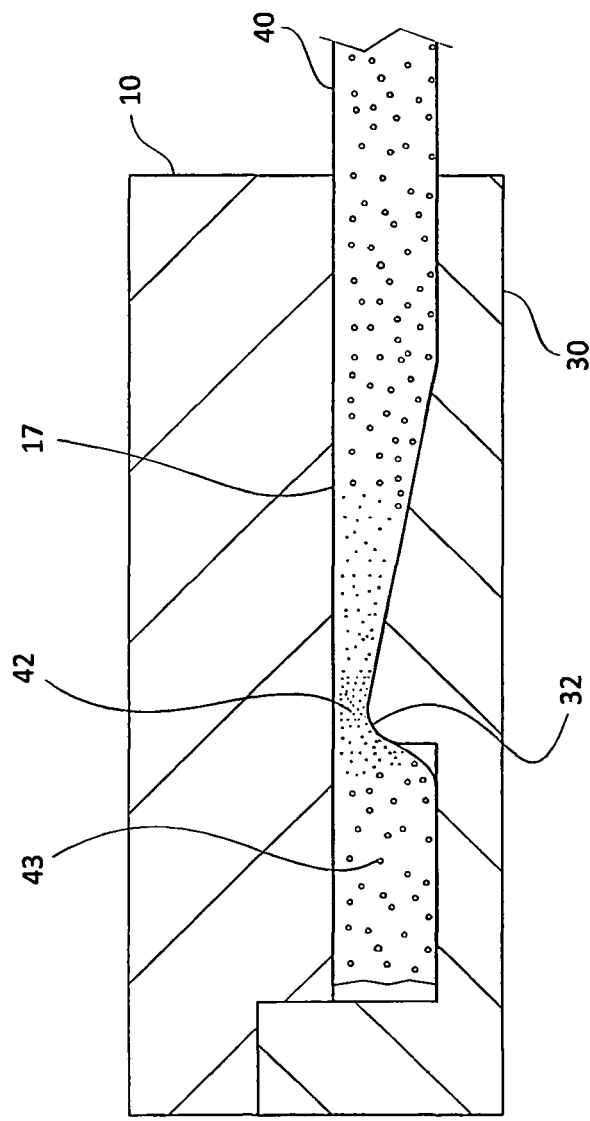
FIG. 6: Cross sectional view of tubular membrane compressed between tube sheet wall and insertable hollow mandrel.

A compressed tubular membrane 40 is shown schematically in FIG. 6. The figure shows a cross sectional view of the tube sheet 10 and the insertable hollow mandrel 30 with the wall of the tubular membrane 40. The porous structure of the tubular membrane is compressed where the ridge 32 of the insertable hollow mandrel 30 approaches the wall of the bore in the tube sheet 10.

Again referring to FIG. 6, the optimal clearance between the ridges 32 on the insertable hollow mandrel and the wall of the bores 17 in the tube sheet 10 may be determined experimentally or by measuring or calculating the compressibility of the wall of the tubular membrane 40. Ideally, the wall of the tubular membrane 40 should be compressed nearly to the point of a solid to assure a tight and permanent seal. The degree of compression is a function of the clearance between the ridges 32 on the insertable hollow mandrel 30 and the wall 17 of the bore in the tube sheet 10, as well as the porosity of the tubular membrane 40. The purpose of the ridges 32 on the insertable hollow mandrel 30 is to provide maximum compression of the tubular membrane 40 between the ridge 32 of the insertable hollow mandrel 30 and the wall of the bore 17. This converts the tubular membrane 10 into a gasketing or sealing material between the insertable hollow mandrel 30 and the tube sheet 10, effectively both locking the insertable hollow mandrel 30 in place and eliminating any penetration of liquid between the two surfaces 32 and 17.

An approximate calculation would involve using the porosity (defined earlier) of the membrane and the wall thickness of the tubular membrane 40. The porosity represents the volume fraction of open space in the wall, therefore (1−porosity/100) would yield the fraction of material in the wall that is solid polymer. Multiplying the fraction of solid material in the wall times the wall thickness yields an approximate value for the desired compressed thickness of the tubular membrane 40 wall between the tube sheet bore 14 wall and the insertable hollow mandrel 30. For example, a material with a porosity of 40% and a wall thickness of 0.1 millimeter could expect to have the wall compressed to (Compressed wall=(1−40/100)×0.1=) 0.06 millimeters. This would represent the desired clearance between the wall of the bore 14 in the tube sheet 10 and the ridge 32 on the insertable hollow mandrel 30.

The thickness of the tube sheet 10 may vary, and is generally dependent on the diameter of the housing 20 and the length of the insertable hollow mandrel 30. The tube sheet 10 should be thick enough to allow for secure fastening to the housing 20 without displacing unnecessary volume inside the housing 20. It is desirable that the thickness of the tube sheet 10 be about 10% to 25% of the thickness of the inner diameter of the housing 20, although for smaller housings, thicker tube sheets may be employed to be certain that the insertable mandrel 30 is fully embedded in the tube sheet 10. Less than about 10% of the thickness of the inner diameter of the housing may not allow sufficient thickness to provide insertable mandrel stability and a seal around the insertable mandrel, and greater than about 25% would lead to unnecessary wasted space and material. In all cases, it is important that the thickness of the tube sheet 10 be equal to, or greater than the distance from the inner face 33 of the outer flange 31 of the insertable mandrel FIG. 4A, 4B, 4C, or 4D to the first ridge 32 encountered axially when moving from the outer flange 35 to the insertable mandrel end 34.

The diameter of the holes 14 in the tube sheet 10 is determined by the outer diameter of the tubular membrane 40. The diameter of the hole 14 is generally equal to the outer diameter of the tubular membrane 40 but may also be slightly smaller or slightly larger than the outer diameter of the tubular membrane 40 depending on the softness of the tubular membrane 40, the packing density, and the desired profile of the tubular membrane as it enters the tube sheet 10. If the holes 14 in the tube sheet 10 are much smaller than the diameter of the tubular membrane 40, then the wall of the membrane will have a propensity to fold in on itself, creating a potential leak and prohibiting the insertable mandrel 30 from seating properly. If the hole 14 is slightly larger than the diameter of the tubular membrane 40, then the tubular membrane must be able to stretch to accommodate the larger insertable mandrel 30. This runs the risk of tearing or damaging the membrane or creating a pocket where debris may accumulate.

FIGS. 5A-5D, depict the steps involved with inserting an insertable mandrel 30 into a tubular membrane and mounting said tubular membrane into a tube sheet 10. The insertable mandrel 30 is designed so that the inner diameter 31 of the insertable mandrel closely matches the inner diameter of the tubular membrane. Thus, when inserted and installed, the flow restriction caused by the insertable mandrel is minimized and the potential for any contaminants to accumulate in the inner chamber of the housing and the tube sheet are minimized. The outer diameter of the insertable portion of the mandrel is sized to be of a diameter less than the diameter of the hole in the tube sheet but large enough to properly compress the wall of the tubular membrane. Depending on the porosity of the tube as defined earlier, the clearance between the largest diameter of the insertable mandrel and the wall of the tube sheet hole should be equal to or slightly greater than (1−Porosity/100)*(wall thickness of the tube).

Figure 5A:
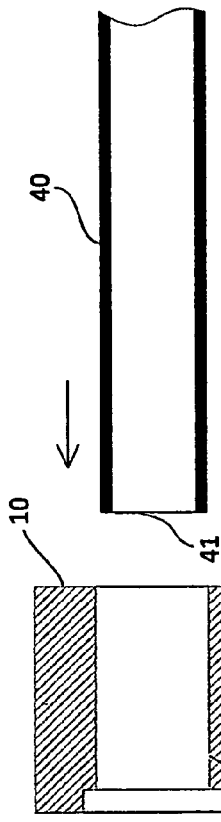
FIG. 5A depicts the insertion of the tubular membrane into the tube sheet.
Figure 5B:
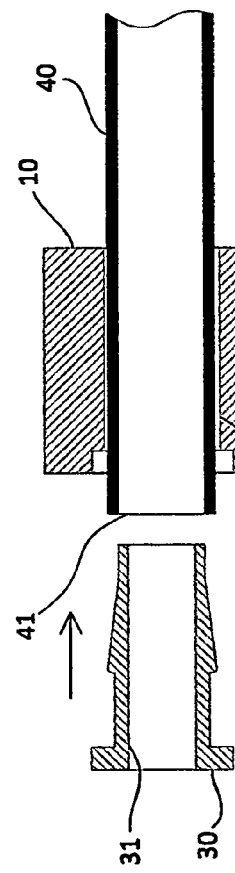
FIG. 5B shows the insertable mandrel ready to be placed inside the membrane.
Figure 5C:
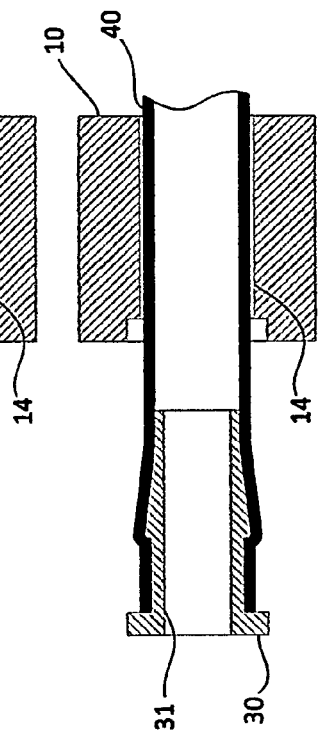
FIG. 5C depicts the insertable mandrel inside the tubular membrane prior to being pulled into the tube sheet.

Prior to mounting the tube sheet into the housing, the tubular membranes are mounted into the tube sheet. To illustrate this novel operation, FIG. 5A shows a cross section of the tube sheet 10 with a typical bored and counterbored hole 14, a tubular membrane prior to insertion 40, and an insertable hollow mandrel 30. As shown in FIG. 5B, the tubular membrane 40 is inserted through the hole 14 in the tube sheet 10 and pulled through to a length equal to or greater than the length of the insertable hollow mandrel 30. While this is not absolutely necessary, it facilitates the installation of the insertable hollow mandrel 30 into the opening 41 of the tubular membrane 40 in FIG. 5A. The insertable hollow mandrel 30 is then pushed into the opening 41 of the tubular membrane 40. The tubular membrane may be supported on a post or simply held by hand. The tubular membrane 40 with the insertable mandrel 30 fully inside the end opening 41 of the tubular membrane is shown in FIG. 5C.

Figure 5D:
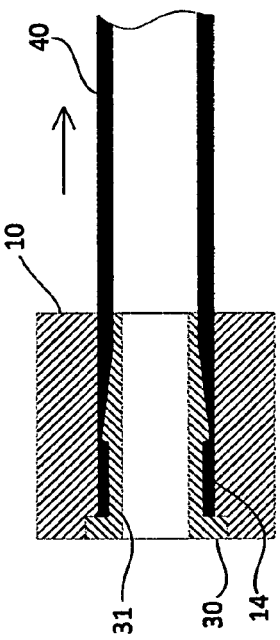
FIG. 5D illustrates the cross section of the completed assembly.

The tubular membrane 40 fitted with the insertable hollow mandrel 30 is then pulled back through the hole 14 in the tube sheet 10 until the insertable hollow mandrel begins to seat in the tube sheet FIG. 5D. At this point in the assembly process there is considerable resistance to further advancement of the tubular membrane into the tube sheet and pressure needs to be applied to the insertable hollow mandrel to force it into the hole. This pressure means may be applied mechanically with the aid of a lever, hammer, or other device to drive the mandrel into the hole, or may be pressed home by hand.

As can be seen in FIG. 6, the tubular membrane wall 42 is deformed and compressed between the contact points 32 of the insertable hollow mandrel and the wall of the tube sheet 17 during the act of pushing the insertable hollow mandrel 30 into the end of the tubular membrane 40.

Figure 7:
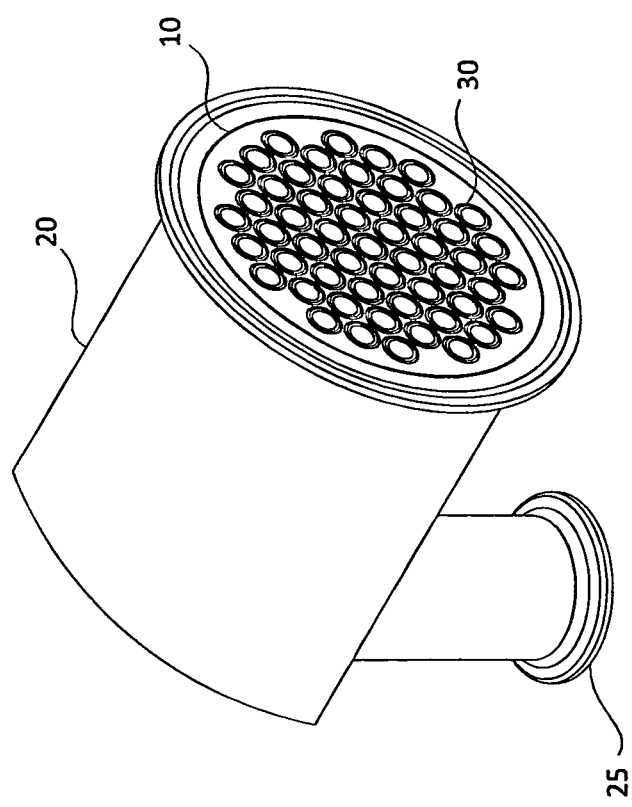
FIG. 7: End view of housing showing assembled tubular membranes and insertable hollow mandrel in housing.

When fully inserted, the tubular membrane is locked in place and a fluid tight interference fit seal is established between the lumen end of the tubular membrane and the inner chamber of the housing. When fully inserted, the tube end is flush with the outside face of the tube sheet assuming the holes are counterbored. If the holes are not counterbored, the insertable hollow mandrel will project a distance beyond the outside face of the tube sheet by the thickness of the outer flange 35 on the insertable hollow mandrel. A fully assembled end of a module is shown in FIG. 7, showing the tube sheet 10 mounted in the housing 20 with the insertable hollow mandrels 30 flush with the surface of the tube sheet 10. The tubular membranes 40, one for each of the insertable hollow mandrels 30, project backwards into the body of the housing 20.

To prepare the second end of the module, the tubular membranes 40 may be simply fed into the holes on the opposing tube sheet 10 and the process repeated with the final stage being the placement of the tube sheet 10 into the end of the housing 20. While this is appropriate for modules where there are relatively few tubular membranes or the module length is less than 0.5 meters or so, generally it is more practical to employ an alignment tool to ensure that the tubular membranes 40 are straight and inserted into the corresponding hole in the opposite tube sheet 10. Failure to do so will result in crossed tubular membranes and possible flow restrictions.

The process of aligning the tubular membranes 40 is shown in FIGS. 8A, 8B, 8C, and 8D. FIG. 8A shows the first tube sheet 10 with the installed tubular membranes 40, and the hollow mandrels 30 inserted into the tube sheet 10 holding the membranes in place, prior to it being mounted into the housing 20. FIG. 8B shows one of many types of alignment tools, this one consisting of a disc 51 with aligning rods 52, one for each of the tubular membranes 40. The alignment tool is inserted into the finished tube sheet 10 in FIG. 8C that has been mounted into the housing 20, causing the end of each tubular membrane 40 to align in the same pattern established with the first tube sheet 10. Once the tubular membranes 40 are aligned, they may be individually mounted into the second tube sheet 10 in the proper configuration, assuring accurate alignment and straight tubular membranes 40. Once the tubular membranes are affixed in the second tube sheet, the alignment tool may be extracted. One of the qualifications for a properly designed alignment tool is that the aligning rods 52 are somewhat shorter than the tubular membranes to allow sufficient excess tubular membrane to be pulled into the tube sheet.

One of the many advantages of this invention method is that the mounting and sealing the porous tubular membranes in the tube sheets is reversible. During the course of use of a membrane contactor or filter, membrane tubes will occasionally be damaged, become plugged, tear, or otherwise fail, rendering the unit useless. A failed tube will cause the entire module to become inoperable. With other methods of mounting tubular membranes into end plates or tube sheets, the tubular membrane is permanently affixed to the tube sheet. With this invention, this shortcoming is eliminated, allowing the end user to remove and replace a singular or multiple tubular membrane(s) without destroying the housing, the tube sheet, or the remaining tubular membranes. It is conceivable that all the tubes could be removed and replaced, saving the housing and tube sheet assembly.

To remove a damaged or clogged tubular membrane, one uses an extraction device such as the one shown in FIGS. 9A-9D to pull the insertable hollow mandrel from one of the tube sheets. The device shown in FIG. 9A is one example of several possible designs for safe removal of the insertable hollow mandrel 30. This device consists of a soft rubber cylinder 62 fitted with a threaded rod 64 connected to a retaining washer at one end and a turning handle 61 on the other. Once inserted inside the insertable hollow mandrel 30, the handle 61 is turned, causing the retaining washer to compress the soft rubber cylinder 62 inside the insertable hollow mandrel. Once the rubber cylinder is fully compressed inside the insertable hollow mandrel, the entire unit is pulled away from the tube sheet, extracting the insertable hollow mandrel in the process. Once out of the tube sheet, the insertable hollow mandrel may be removed from the tubular membrane and the extraction tool may be reversed and removed from the insertable hollow mandrel.

Figure 10B:
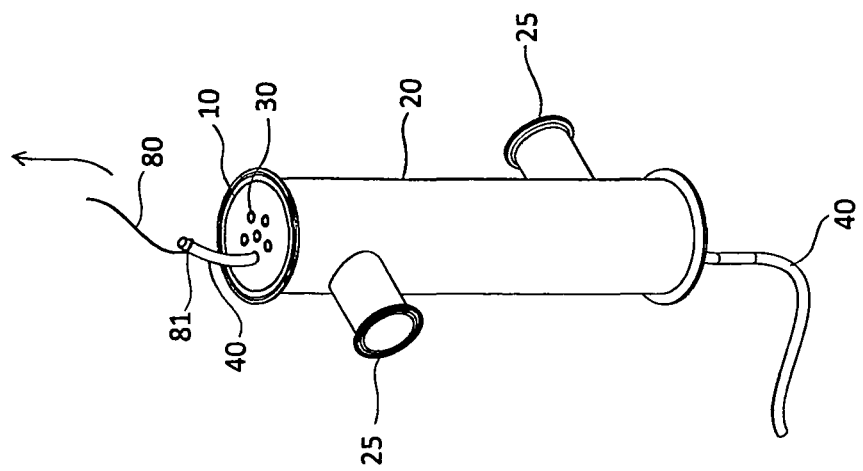
FIGS. 10, A, 10B: Operational sequence showing removal of damaged fiber (FIG. 10A), and replacement with new fiber (FIG. 10B).
Figure 10A:
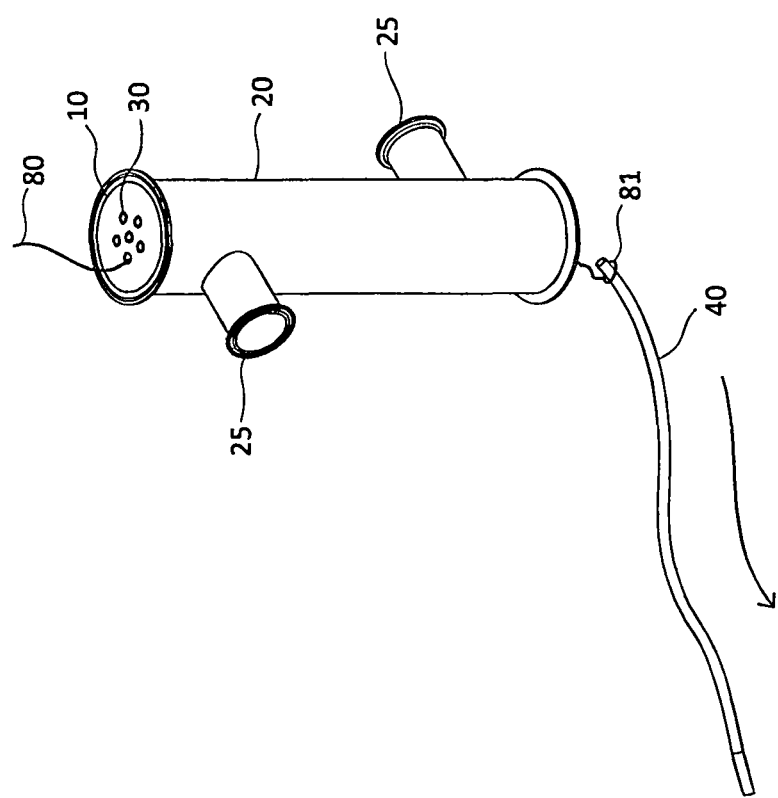

This process is then repeated at the other end of the membrane module. Prior to removal of the tubular membrane 40 in question, a fish line 80 in FIG. 10A is attached to one free end of the tubular membrane 40 via a simple knot 81. On removal of the tubular membrane 40, the fish line comes in through the holes in each of the tube sheets 10. Referencing FIG. 10B, the fish line is then used to pull the new tubular membrane in place where it may be sealed with the insertable hollow mandrel as described earlier. When the far end of the new tubular membrane is close to the first tube sheet, an insertable hollow mandrel is placed in the end of the tubular membrane and pressed into the tube sheet, securing the one end.

In this way a single tubular membrane or multiple tubular membranes may be extracted and replaced with no damage to adjacent membranes, the tube sheet, or the housing itself. All the other tubular membranes remain sealed as before.

In general, during the process of extraction of the insertable mandrels, if care is taken they are not damaged in the process of extraction they may be used over again. If there is any sign of damage they may simply be replaced with new ones.

Example 1

Tubular Membrane Module with 55 Elements

The construction of a cross flow module consisting of 55 tubular membranes in a 4 inch diameter by 36 inch long stainless steel housing with PVDF tube sheets and stainless steel insertable mandrels is described in this example.

Fifty-five (55) porous PTFE tubular membranes measuring 0.312 inches inner diameter by 0.375 inches outer diameter by 37.5 inches in length were used in construction of this module. Each tube has a porosity of 55%.

Two PVDF tube sheets were prepared from PVDF sheet stock. The tube sheets consist of circular disks cut to a diameter of 3.8 inches and 1.0 inches thick. The 3.8 inch diameter allows the tube sheet to match the inside diameter of the housing. Each disc was drilled with fifty-five (55) through-bores measuring 0.393 inches in diameter spaced evenly apart as a series of concentric rings over the face of the tube sheet. Each tube sheet has two channels of 0.15 inches in width and 0.18 inches in depth cut into the circumference to allow for placement of O-ring seals. Two 0.125 inch diameter Viton "O" rings are used around the circumference of each disc to provide a fluid tight seal when this disc is inserted into the stainless steel housing. Each through-bore has a counterbore of 0.404 inches in diameter, and 0.060 inches deep. The counterbores are cut into the outside face of each tube sheet and allow the insertable hollow mandrels to sit flush with the outside face of the tube sheet. Three stainless steel pins mounted on the inside surface of the housing one-inch in from each end of the housing provides a position stop against which the tube sheet may be seated.

The housing consists of a stainless steel seamless tube fitted at each end with a sanitary tri-clamp flange fitting to adapt to the process. The inner diameter of the tube is 0.38 inches as stated above. The housing was fitted with two side take-off nipples that were welded perpendicular to the body of the housing. The two side take-off nipples are 1.25 inch stainless steel pipes with NPT threading on the outer ends.

One end of each tube is fitted with a 316 stainless steel insertable hollow mandrel by sliding the mandrel into the end of the tubular membrane and stretching it over the ridge in the mandrel. Each insertable hollow mandrel is 0.9 inches in overall length, with a through-bore of 0.275 inches. The insertable hollow mandrel is cut with an outer lip on one end that is designed to fit into the counterbore in the tube sheet once inserted. The diameter of the outer lip is 0.40 inches and the thickness of the lip is 0.060 inches. The body of the mandrel is cut with a circumferential protrusion that tapers from the initial outside diameter of 0.31 inches of the mandrel to a land with a length of 0.05 inches and a diameter of 0.345 inches. The taper begins at a distance of 0.1 inches from the leading end of the mandrel and increases in diameter concentrically over a length of 0.46 inches.

The insertable hollow mandrel is pushed into the end of the tubular membrane until the end of the tubular membrane abuts the lip at the outer end of the insertable hollow mandrel. The individual tubular membrane containing the fitting is then inserted through one of the holes in the PVDF tube sheet, feeding the end of the tubular membrane with no fitting first, from the outer face of the tube sheet in towards the inner face. The fitting is then press fitted down into the tube sheet until the top surface of the fitting is flush with the outer surface of the tube sheet. The clearance between the inside wall of the bore in the tube sheet and the outer diameter of the largest diameter on the insertable hollow mandrel is 0.024 inches. This compares with the wall thickness of the tubular membrane of 0.0315 inches. Because of the porosity and the compressibility of the PTFE tubular membrane, the wall is compressed from 0.0315 to 0.024 inches, effectively establishing a tight seal over the enlargement of the mandrel. The compression of the tubular membrane between the tube sheet wall and the insertable hollow mandrel also locks the insertable hollow mandrel in place.

This process of inserting a fitting into each tube followed by inserting the fitted tube into the PVDF tube sheet is repeated until all fifty-five bores are filled and properly seated.

The fifty-five tubes are then fed loose ends first into the housing. The PVDF tube sheet containing the two "O" rings is then press fitted into the end of the housing, coming to rest against the stops. The tubes are then pulled taut through the opposite end of the housing.

Once the first tube sheet is seated, an alignment tool consisting of a disk with 55 rods, each 0.1875 inches in diameter and 38 inches in length is inserted into the tube sheet. The rods in the tool affect alignment of the loose tubular membranes, allowing for easier feeding through the second tube sheet. The loose tubular membrane ends are fed through the bores of the second tube sheet and pulled through so the excess length of tubular membrane is on the outside face of the tube sheet. Once complete, the tube sheet is seated inside the end of the housing against the stops.

After the tube sheet is seated inside the end of the housing the alignment tool is withdrawn and each free end is fitted with an insertable hollow mandrel. Each tubular membrane is pulled taut and the insertable hollow mandrel is pushed into the open end. Holding the end of the tubular membrane with pliers or other holding or gripping means facilitates the operation. Once the insertable hollow mandrel is in place in the free end of the tubular membrane, the insertable hollow mandrel is seated into the tube sheet and the excess tubular membrane is trimmed with a razor or other cutting methods.

The completely assembled unit was pressure tested by filling the housing from the shell side with water and ensuring each tubular membrane is filled with water. Once the assembly process is complete one applies air pressure through the shell side of the housing and observes any air bubbles around the perimeter of the tube sheet or any of the mandrels. The unit was found to be leak free.

Example 2

Eight Element Tubular Membrane Module

The construction of a fluid-tight cross flow module consisting of eight tubular membranes in a 1.5 inch diameter by 72 inch long Schedule 80 PVC (polyvinyl chloride) pipe employed as a housing with PVC tube sheets and stainless steel insertable hollow mandrels is described in this example.

Eight (8) porous PTFE tubular membranes measuring 0.312 inches inner diameter by 0.375 inches outer diameter by 73 inches in length were used in construction of this module. Each tube had a measured porosity of 55%.

Two PVC tube sheets were prepared from PVC sheet stock. The tube sheets consist of circular disks cut to a diameter of 1.950 inches in diameter and 0.625 inches thick. The 1.950 inch diameter allows the tube sheet to match the outside diameter of the PVC pipe employed as a housing. One-half inch (0.500") length of this tube sheet was then undercut or stepped to fit snuggly into the inner diameter of the PVC pipe employed as a housing. Each disc was drilled with eight (8) through bores measuring 0.393 inches in diameter spaced evenly apart as a series of concentric rings over the face of the tube sheet. Each through bore had a counterbore of 0.404 inches in diameter and 0.060 inches deep. The counterbores are cut into the outside face of each tube sheet and allow the insertable mandrels to sit flush with the outside face of the tube sheet.

The housing was constructed from two 35 inch lengths of Schedule 80 PVC pipe fitted together into a 1½ inch "T" fitting. This "T" fitting had a side port consisting of a ½ inch FNPT (female national pipe thread) reducing bushing, along with two union connectors fitted onto each end of the PVC housing to allow for process connections.

One end of each tubular membrane is fitted with a 316 stainless steel insertable hollow mandrel by sliding the mandrel into the end of the tubular membrane and stretching it over the ridge in the mandrel. Each insertable hollow mandrel is 0.9 inches in overall length, with a through bore of 0.275 inches. The insertable hollow mandrel is cut with an outer lip on one end that is designed to fit into the counterbore in the tube sheet once inserted. The diameter of the outer lip is 0.404 inches and the thickness of the lip is 0.060 inches. The body of the mandrel is cut with a circumferential protrusion that tapers from the initial outside diameter of 0.300 inches of the mandrel to a land with a length of 0.05 inches and a diameter of 0.345 inches. The taper begins at a distance of 0.1 inches from the leading end of the mandrel and increases in diameter concentrically over a length of 0.30 inches.

The insertable hollow mandrel is pushed into the end of the tubular membrane until the end of the tubular membrane abuts the lip at the outer end of the insertable hollow mandrel. The individual tubular membrane containing the fitting is then inserted through one of the holes in the PVC tube sheet, feeding the end of the tubular membrane with no fitting first, from the outer face of the tube sheet in towards the inner face. The fitting is then press fitted down into the tube sheet until the top surface of the fitting is flush with the outer surface of the tube sheet. The clearance between the inside wall of the bore in the tube sheet and the outer diameter of the largest diameter on the insertable hollow mandrel is 0.024 inches. This compares with the wall thickness of the tubular membrane of 0.0315 inches. Because of the porosity and the compressibility of the PTFE tubular membrane, the membrane wall is compressed from 0.0315 to 0.024 inches, effectively establishing a fluid-tight seal over the enlargement of the mandrel. The compression of the tubular membrane between the tube sheet wall and the insertable hollow mandrel also locks the insertable mandrel in place.

This process of inserting a fitting into each tube followed by inserting the fitted tube into the PVC tube sheet is repeated until all eight bores are filled and properly seated.

The eight tubes are then fed, loose ends first, into the housing. The stepped PVC tube sheet is then glued using PVC primer and cement—then inserted into the end of the PVC housing. The tubes are then pulled taut through the opposite end of the housing.

Once the first tube sheet is seated, an alignment tool consisting of a disk with 8 rods, each 0.1875 inches in diameter and 74 inches in length is inserted into the tube sheet. The rods facilitate alignment of the loose tubular membranes, allowing for easier feeding through the second tube sheet. The loose tubular membrane ends are fed through the bores for the second tube sheet and pulled through so the excess length of tubular membrane is on the outside face of the tube sheet.

When complete, the alignment tool is withdrawn and the stepped tube sheet is glued and inserted into the end of the PVC housing until properly seated. The free end of the membranes are then trimmed, exposing approximately one inch of tubing to be fitted with an insertable SS hollow mandrel. The tubular membrane is pulled taut and the insertable hollow mandrel is pushed into the open end. Holding the end of the tubular membrane with pliers or other holding or gripping means may facilitate this operation. Once the insertable hollow mandrel is in place in the free end of the tubular membrane, the insertable hollow mandrel is seated into the tube sheet. Lastly, one half of each union fitting is glued onto each end of the PVC housing containing the tube sheets.

The completely assembled unit was pressure tested by filling the housing from the shell side with water and ensuring each tubular membrane is filled with water. Once each tubular membrane is filled with water one applies air pressure through the shell side of the housing and observes any air bubbles or water leaks around the perimeter of all glued joints or interfaces of the mandrels in the tube sheets. The unit was found to be leak free.

We claim:

1. A tubular membrane module, comprising at least one tube sheet with one or more holes disposed therein; one or more individual compressible polytetrafluoroethylene tubular membranes each having first ends disposed within a respective hole of the tube sheet; one or more insertable hollow mandrels which have an outer flange protruding from a top lip of the mandrel and at least one ridge cut circumstantially projecting out from the body of the mandrel inserted into the first ends of the tubular membranes, with the first ends of the tubular membranes held in place in the tube sheet by a physical interference fit created between the insertable hollow mandrels and tube sheet; and, a containment shell in which the tube sheet and tubular membranes are disposed.

2. A tubular membrane module according to claim 1, wherein the one or more individual polymer tubular membranes comprise porous membranes.

3. A tubular membrane module according to claim 1, wherein the one or more holes and one or more insertable hollow mandrels are dimensioned relative to one another to provide compression of the tubular membranes ends by the physical interference fit between the insertable hollow mandrels and tube sheet.

4. A tubular membrane module according to claim 3, wherein the tubular membranes are reversibly compressible to permit at least partial recovery to the membranes' original state following removal of the compression of the tubular membrane ends at the physical interference fit created between the insertable hollow mandrel and tube sheet.

5. A tubular membrane module according to claim 1, wherein the diameters of one or more holes in the tube sheet are greater than the outer diameters of the tubular membranes.

6. A tubular membrane module according to claim 1, wherein the diameter of the insertable mandrels is less than twice the wall thickness of the tubular membranes.

7. A tubular membrane module according to claim 1, wherein the diameter of the insertable mandrels is less than the diameter of the tube sheet holes minus twice the wall thickness of the membrane tubular membranes when attached to the tube sheet.

8. A tubular membrane module according to claim 1, wherein the containment shell comprises perfluorinated homopolymers of polytetrafluoroethylene, fluorinated homopolymers of polyvinylidene fluoride, hexafluoropropylene, perfluoropropylvinyl ether, chlorotrifluoroethylene, alkoxy, partially fluorinated ethylene, fluorinated ethylene propylene, or combinations thereof.

9. A tubular membrane module according claim 1, wherein the containment shell comprises stainless steel.

10. A tubular membrane module according to claim 1, wherein the containment shell comprises polyvinylchloride, polysulfone, polyethersulfone, polycarbonate, polyether ether ketone, polyetherketone, polyamides, polyimides, or combinations thereof.

11. A tubular membrane module according to claim 1, wherein the tube sheet comprises polyvinylidene fluoride.

12. A tubular membrane module according to any one of the claim 1, wherein the tube sheet comprises plastics, polymer composites, ceramics, metals, or combinations thereof.

13. A tubular membrane module according to claim 1, wherein the tube sheet comprises stainless steel.

14. A tubular membrane module according to claim 1, wherein the insertable hollow mandrels comprise stainless steel.

15. A tubular membrane module according to claim 1, wherein the insertable hollow mandrels comprise plastics, plastic composites, ceramics, metals, or combinations thereof.

16. A tubular membrane module according to claim 1, wherein the durometer hardness of the tube sheet is greater than the durometer hardness of the tubular membranes.

17. A tubular membrane module according to claim 1, wherein durometer hardness of the insertable hollow mandrels is greater than the durometer hardness of the tube sheet or the tubular membranes.

18. A tubular membrane module according to claim 1, wherein the insertable hollow mandrel has a durometer hardness less than the durometer hardness of the tube sheet and greater than the durometer hardness of the tubular membranes.

19. A tubular membrane module according to claim 1, wherein the insertable hollow mandrels contain a ridge that is coplanar to the inner face of the tube sheet on complete insertion into the tube sheet.

20. A tubular membrane module according to claim 19, wherein the ridge on the insertable hollow mandrels is frusto-conical.

21. A method for producing a tubular membrane module comprising at least one tube sheet with one or more holes disposed therein; one or more individual compressible polytetrafluoroethylene tubular membranes each having first ends disposed within a respective hole of the tube sheet; one or more insertable hollow mandrels, which have an outer flange protruding from a top lip of the mandrel and at least one ridge cut circumstantially projecting out from the body of the mandrel, with said mandrel inserted into the first ends of the tubular membranes, with the first ends of the tubular membranes held in place in the tube sheet by a physical interference fit created between the insertable hollow mandrels and tube sheet; and, a containment shell in which the tube sheet and tubular membranes are disposed.

22. The method according to claim 21, wherein the diameter of the insertable hollow mandrels is less than twice the wall thickness of the tubular membranes and the diameter of the insertable hollow mandrels is less than the diameter of the tube sheet holes minus twice the diameter of the wall thickness of the compressed tubular membranes.

23. The method according to claim 21, wherein the containment shell comprises perfluorinated homopolymers of polytetrafluoroethylene, fluorinated homopolymers of polyvinylidene fluoride, perfluorinated copolymers of tetrafluoroethylene and hexafluoropropylene, copolymers of tetrafluoroethylene and perfluoropropylvinyl ether, copolymers of tetrafluoroethylene and chlorotrifluoroethylene, copolymers of tetrafluoroethylene and alkoxy, partially fluorinated copolymers of ethylene and tetrafluoroethylene, ethylene and fluorinated ethylene propylene, perfluorinated and similar materials, or polyvinylchloride, polysulfone, polyethersulfone, polycarbonate, polyether ether ketone, polyetherketone, polyamides, or polyimides, or stainless steel, or combinations thereof.

24. The method according to claim 21, wherein the step of inserting the one or more hollow mandrels comprises reversibly inserting the one or more hollow mandrels.

25. The method according to claim 21, wherein the self sealed tubular membranes can be removed by physical means without damaging the integrity of the tubular membrane module.

26. The method according to claim 21, wherein the at least one self sealed tubular membrane can be replaced with another self-sealed tubular membrane without damaging the integrity of the tubular membrane module.

27. The method according to claim 21, comprising inserting a respective alignment rod into each of the holes of the tube sheet and into the associated polymer tubular membrane installed in each hole to align each polymer tubular membrane along the length of the containment shell, and placing an additional tube sheet with one or more holes at a second end of the tube sheet and orienting the additional tube sheet such that the holes of the additional tube sheet are aligned to respective ones of the aligned polymer tubular membranes.

* * * * *